United States Patent

[11] 3,612,117

[72] Inventor Olof Gunnar Herolf Kjell
 Sundsbruk, Sweden
[21] Appl. No. 87,350
[22] Filed Nov. 5, 1970
[45] Patented Oct. 12, 1971
[73] Assignee Soderhamns Verkstader Aktiebolag
 Soderhamn, Sweden
[32] Priority July 25, 1966
[33] Sweden
[31] 651,732
 Continuation of application Ser. No.
 651,732, July 7, 1967, now abandoned.

[54] APPARATUS FOR THE SURFACE TREATMENT OF TREE TRUNKS
 5 Claims, 9 Drawing Figs.
[52] U.S. Cl.................................................... 144/2 Z,
 144/3 D
[51] Int. Cl......................................................A01g 23/02
[50] Field of Search.............................................144/2 Z, 3 D,
 34 R, 34 E, 309 AC

[56] References Cited
 UNITED STATES PATENTS
 3,398,774 8/1968 Hahn............................ 144/2 Z
 Primary Examiner—Gerald A. Dost
 Attorney—Stevens, Davis, Miller & Mosher ABSTRACT: An apparatus for the surface treatment of trees having a frame extending along the tree to be worked upon and a surface-treatment and tree-feeding assembly mounted on and movable along the frame. The assembly is adapted to move back and forth in the longitudinal direction of the tree and has surface-treatment members and tree-gripping members thereon, the latter being adapted to hold the tree while the assembly is moved in one direction and release the tree upon movement in the opposite direction.

APPARATUS FOR THE SURFACE TREATMENT OF TREE TRUNKS

The present application is a continuation of my U.S. Pat. application Ser. No. 651,732 filed July 7, 1967 and now abandoned.

The present invention relates to a means for the surface treatment, such as the delimbing and/or the debarking, of tree trunks. Primarily the invention is intended for use in connection with delimbing apparatus, particularly vehicle-borne ones.

Delimbing apparatus are known, which comprise a frame, adapted to extend along the tree trunk to be delimbed, and an assembly movable along said frame, said assembly comprising a number of delimbing members adapted, when in their operative positions, to embrace the tree trunk wholly or partly and, upon movement of said assembly, to separate the limbs from the tree trunk. Usually, the apparatus is mounted on a cross-country vehicle, in which case the frame is adjustable to a substantially vertical position close to a standing tree. In that case the length of the frame is chosen to be so large that a tree of medium length can be substantially completely delimbed by a rapid movement, from below and upwards, of the assembly comprising the delimbing members, said assembly usually being driven by a hydraulic motor via a rope device. Moreover, the apparatus may include members for cutting off the tree trunk at its base and, if desired, also near its top.

Although apparatus of this known kind have proved practically and economically suitable for use in terrain of a suitable character, they have certain drawbacks which put a limit to their possibilities of application. Because of its considerable length the delimbing device is difficult to handle and moreover it is expensive to manufacture. Since, for practical reasons, the length of the frame has to be limited the device cannot be used for the complete delimbing of very tall trees. Another drawback resides in the reduction of the delimbing capacity of the apparatus, which sometimes occurs because of incomplete delimbing work of the delimbing assembly, which results therein that the movement of said assembly along the whole tree trunk sometimes must be repeated one or several times in order that an acceptable delimbing result shall be obtained. Moreover the long frame construction of the apparatus involves certain difficulties in respect of, on one hand, the passableness through the terrain of the forest machine equipped with the apparatus and, on the other hand, in respect of the moving of the same on a road from one felling place to another, in which case there is added a laborious and time-consuming dismantling and mounting of the delimbing device.

The primary object of the present invention is to eliminate the above mentioned drawbacks and to provide a delimbing and/or debarking apparatus, which is simple and compact and which is easy to put on a carrying vehicle of the cross-country type. Another object of the invention is to design a delimbing and/or debarking apparatus of said kind, which can be fed with already felled tree trunks. Still another object of the invention is to provide an apparatus of the kind mentioned in which the cutting of the surface-treated log to suitable lengths can take place during the delimbing operation, by which a certain gain of time is obtained.

An apparatus, according to the invention, for the surface treatment of the trunk of a tree, comprises a frame of a limited length, adapted to extend along the trunk to be treated, and surface-treatment members arranged to embrace the trunk wholly or partly, and the apparatus is characterized by means for producing an intermittent movement of the trunk and said frame, relative to each other, in the longitudinal direction of the trunk. Preferentially, the trunk is moved intermittently relative to the frame.

Said means for producing the intermittent relative movement may consist of an assembly mounted on said frame and movable along the latter and adapted to perform a to-and-fro movement in the longitudinal direction of the tree, which assembly may include gripping members for holding the trunk during the movement thereof in one direction relative to the frame and for removing the hold when said assembly is moved in the opposite direction. In one embodiment of the invention said last-mentioned assembly may, at the same time, be adapted to perform the entire, or part of, the intended surface treatment of the trunk.

The means for accomplishing the foregoing objects and other advantages, which will be apparent to those skilled in the art, are set forth in the accompanying specification and claims, and are illustrated in the accompanying drawings dealing with a basic embodiment of the present invention. Reference is made now to the drawings in which:

Figure 1:
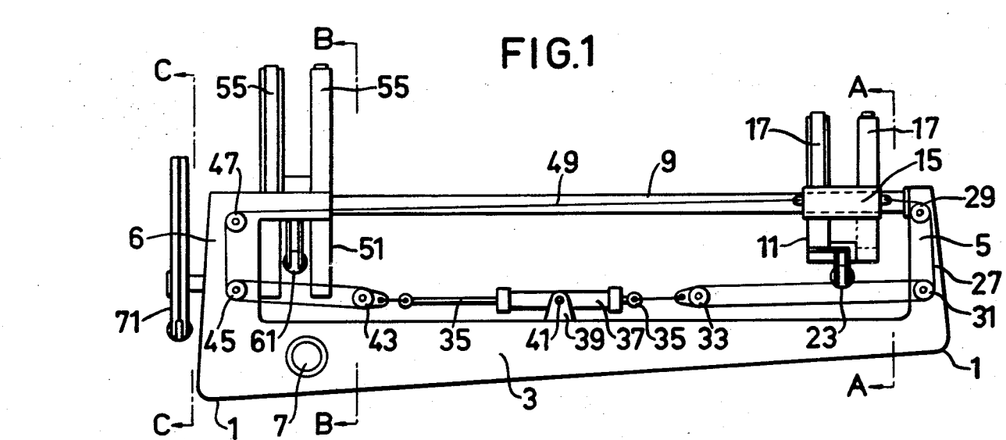
FIG. 1 is a side elevational view of an embodiment of an apparatus, according to the invention, for the surface treatment of tree trunks.
Figures 2, 3:
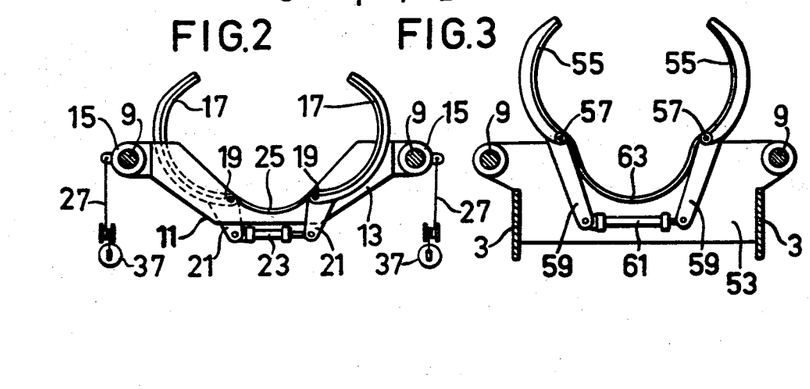
FIG. 2 is a sectional view of the apparatus taken along the line 2—2 of FIG. 1.
FIG. 3 is a sectional view taken along the line 3—3 of FIG. 1.
Figure 4:
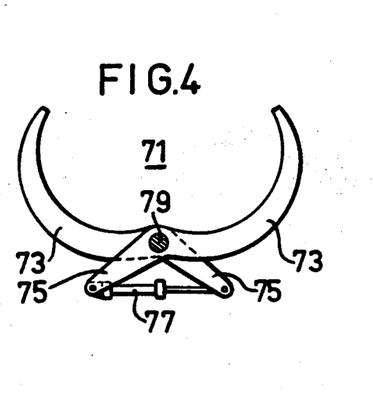
FIG. 4 is a sectional view taken along the line 4—4 of FIG. 1.
Figure 5:
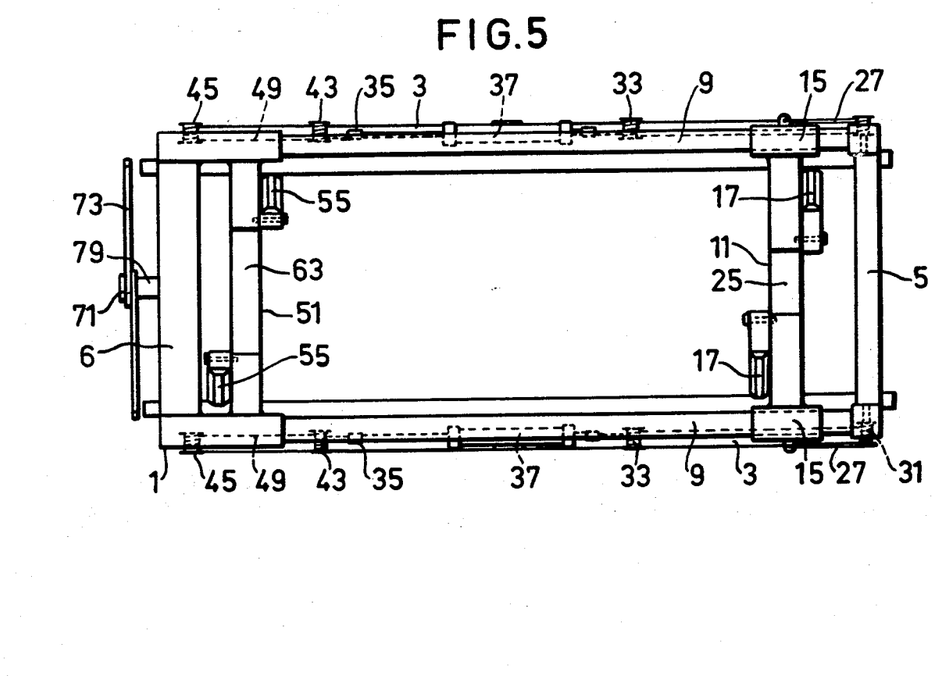
FIG. 5 is a top plan view of the apparatus shown in FIG. 1.
Figure 6:
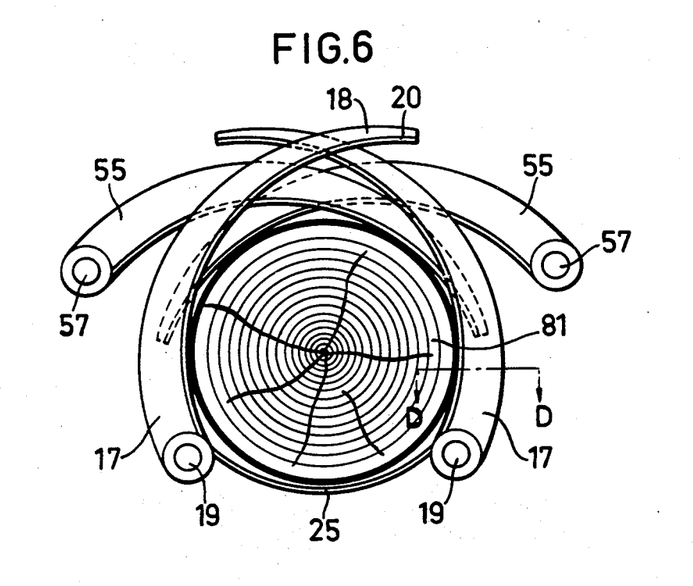
FIG. 6, on an enlarged scale, shows the arrangement of the delimbing members forming part of the apparatus shown in FIG. 1.
Figure 7:
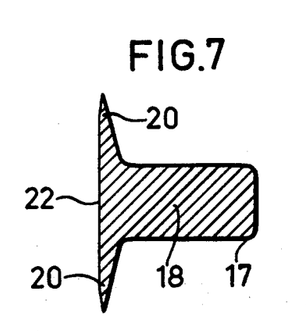
FIG. 7 is a sectional view of a delimbing member of the kind mentioned, taken along the line 7—7 of FIG. 6.

The embodiment of the apparatus according to the invention, shown in FIGS. 1 to 7, comprises a frame, consisting of two side members 3 of some length and end members 5 and 6 rigidly connected with said side members. The frame 1 may be mounted on a carrier in any convenient manner, for instance, it may be mounted turnably on a shaft 7 of the support, said shaft extending at right angles to the longitudinal direction of the frame 1. The end members 5 and 6 support two rods 9 extending along the frame member 3 at a predetermined distance from each other, for example 1 -2 meters, and parallel to each other. The rods 9 serve as guiding means for an assembly 11, which is movable along the rods and serves for intermittently holding, moving and surface treating the tree trunks to be operated upon. The assembly 11 is built on a frame 13, extending between the rods 9 and provided with guide bushings 15, each of said bushings encircling its respective rod 9. On the frame 13 there are provided members 17 for holding and delimbing the tree trunks, said members 17 being rotatably mounted on shafts 19 parallel with the rods 9. The members 17, hereinafter called the delimbing members, are curved, the radius of curvature being at least equal to the radius of curvature of the thickest log to be operated upon. Furthermore the delimbing members 17 are embodied in such a manner that their free ends preferably extend some distance past each other when the members are brought into contact with the tree trunk to be operated upon. A cross sectional view of the delimbing members is found in FIG. 7, showing that each member has a body 18 and a sharp edges 20 extending from said body in the direction of the log, between which edges each of said delimbing members has a plane surface 22, which is meant to be turned towards the tree trunk to be operated upon.

The two delimbing members 17 are formed with downwardly extending lugs 21 between which there is provided a hydraulic motor 23 for operating the delimbing members. A bow-shaped edge portion 25 is provided between the delimbing members 17 at their lower ends. This edge portion may also be formed integral with the frame 13. The edge portion 25 may be provided with sharp edges in the longitudinal direction of the log in a manner similar to what is shown in FIG. 7 with respect to the delimbing members 17.

For moving the delimbing assembly 11 along the rods 9 there is a hydraulic motor 37 together with a rope device, comprising a rope 27, which is, at its one end, secured to the assembly 11 and which runs over a guide pulley 29 and guide pulleys 31 and 33. The two last-mentioned pulleys may form part of a return sheave having a suitable ratio. The sheave comprising one or more guide pulleys 33 is connected to the piston rod 35 of the hydraulic motor 37, which is pivotable on a shaft 41 on a lug 39 of the frame 3. The rope 27 is meant for moving the delimbing assembly 11 in the right-hand direction in FIG. 1. For moving the assembly 11 in the left-hand direction there is provided another rope 49, one end of which is secured to the assembly 11 and runs over a guide pulley 47 and forms part of a return sheave including the guide pulleys 43 and 45, said return sheave being connected with the piston rod 35 on the opposite side of the hydraulic motor in relation to the return sheave comprising the guide pulleys 31 and 33.

Near the end 6 of the frame there is provided another assembly 51 for holding and/or surface treating the trunk of a tree, said assembly comprising a frame 53, on which there are members 55 for holding and/or for surface treatment, again called delimbing members, said members being swingably mounted on shafts 57. The delimbing members 55 may, on the whole, have the same appearance as the delimbing members 17 but have their pivot shafts 57 positioned at a higher level and at a larger distance from each other than the shafts 19 of the delimbing members 17. As shown in FIG. 6, in which the delimbing members 17 and 55 are shown in their operative positions, the delimbing members 55 will thereby perform surface treatment of the trunk 81 at those places, along which the delimbing members 17 effect incomplete delimbing of the log. The delimbing members 55 are provided with downwardly directed lugs 59, between which there is provided a hydraulic motor 61 for operating the delimbing members. Furthermore, between the pivot shafts 57 there is provided a bow-shaped edge portion 63 for the surface treatment of the log. This edge portion has sharp edges extending in the longitudinal direction of the log in a manner similar to that shown in FIG. 7 with respect to the delimbing members 17.

Furthermore, the apparatus according to the invention is also provided with means 71 for cutting the treated tree trunk, said means comprising cutting legs 73 pivotally connected with each other by means of a shaft 79 and formed with lugs 75, between which there is mounted a hydraulic motor 77 for operating the cutting means.

The hydraulic motors, forming part of the apparatus according to the invention, are, in a manner known per se, fed with drive fluid from pumps, not shown, control valves being provided for adjusting, to their desired operative and, respectively, end positions, the members driven by the hydraulic motors.

The delimbing members 17 and 55, respectively, and their appertaining hydraulic motors 23 and 61, respectively, are arranged in such a manner that, after they have been swung into contact with the log, they are able to hold the latter in a firm frictional grip.

Figure 8:
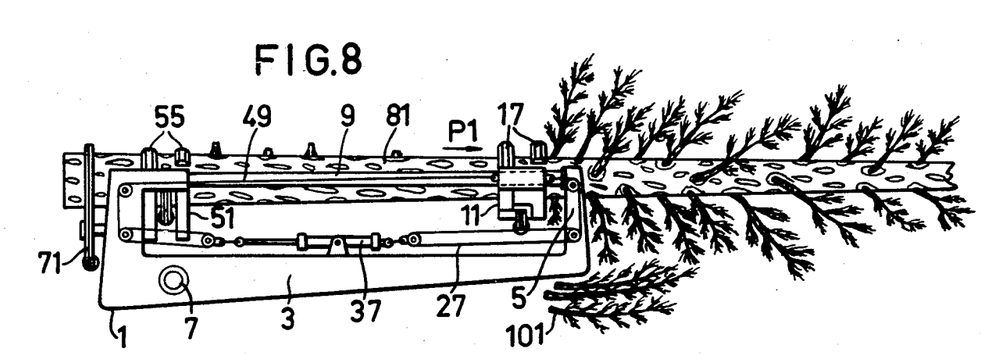
FIGS. 8 and 9 show the apparatus according to FIG. 1 while performing delimbing work on a trunk of a tree.
Figure 9:
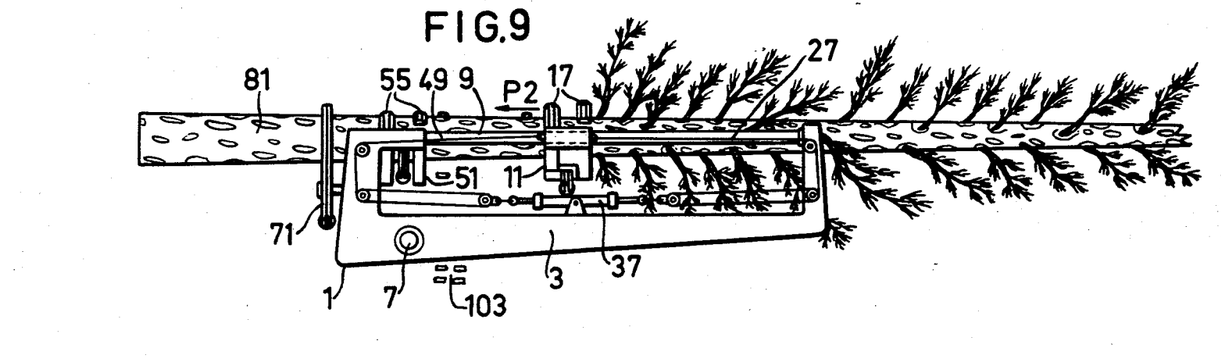
Figure 10:
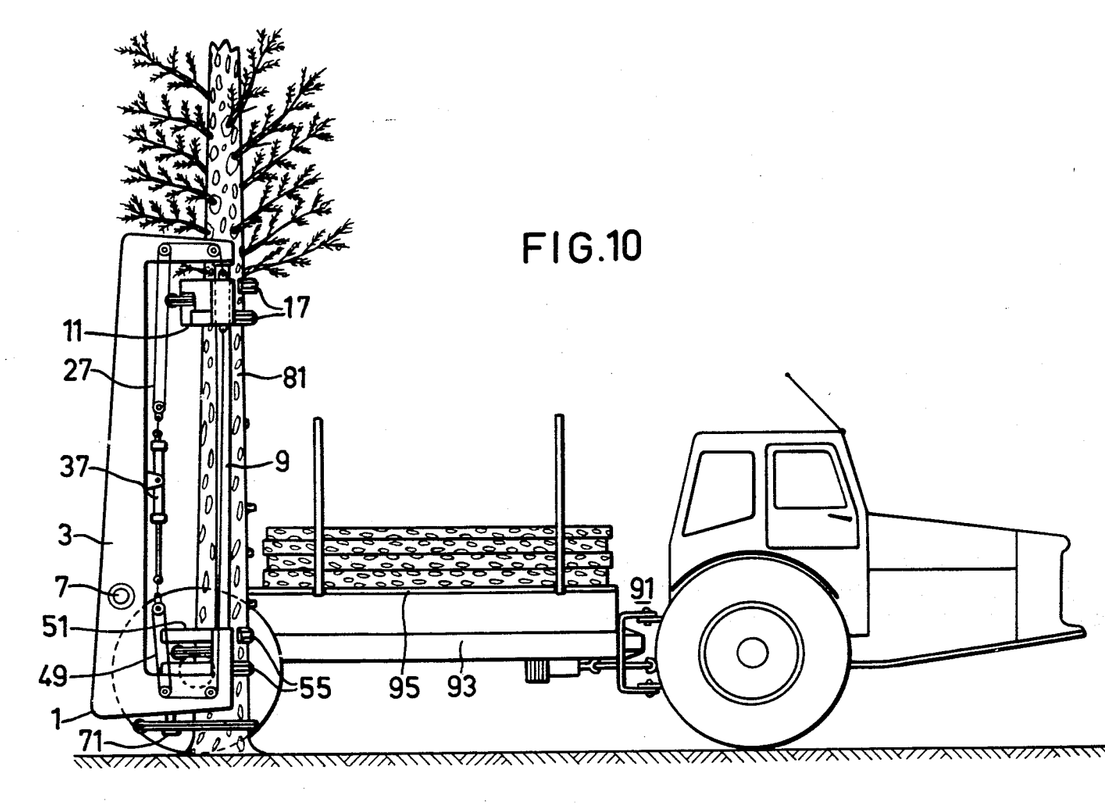
Figure 11:
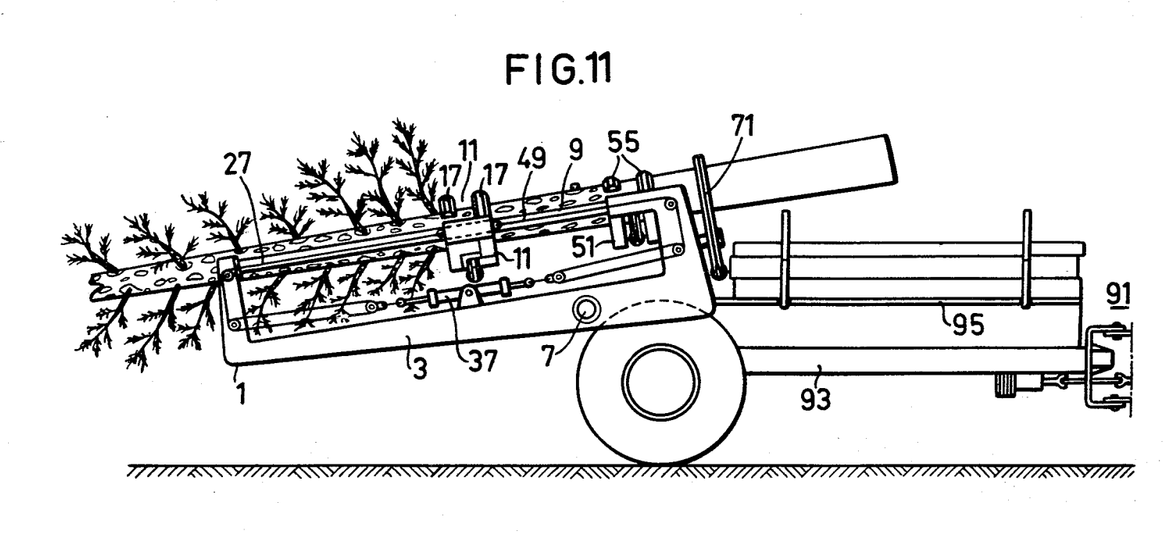
Figure 12:
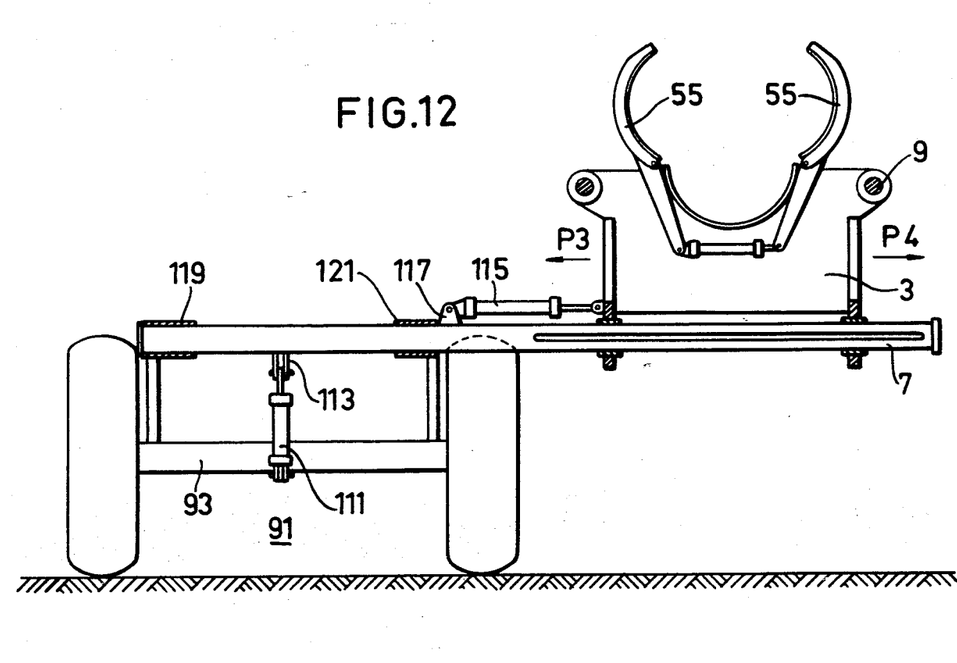
Figure 13:
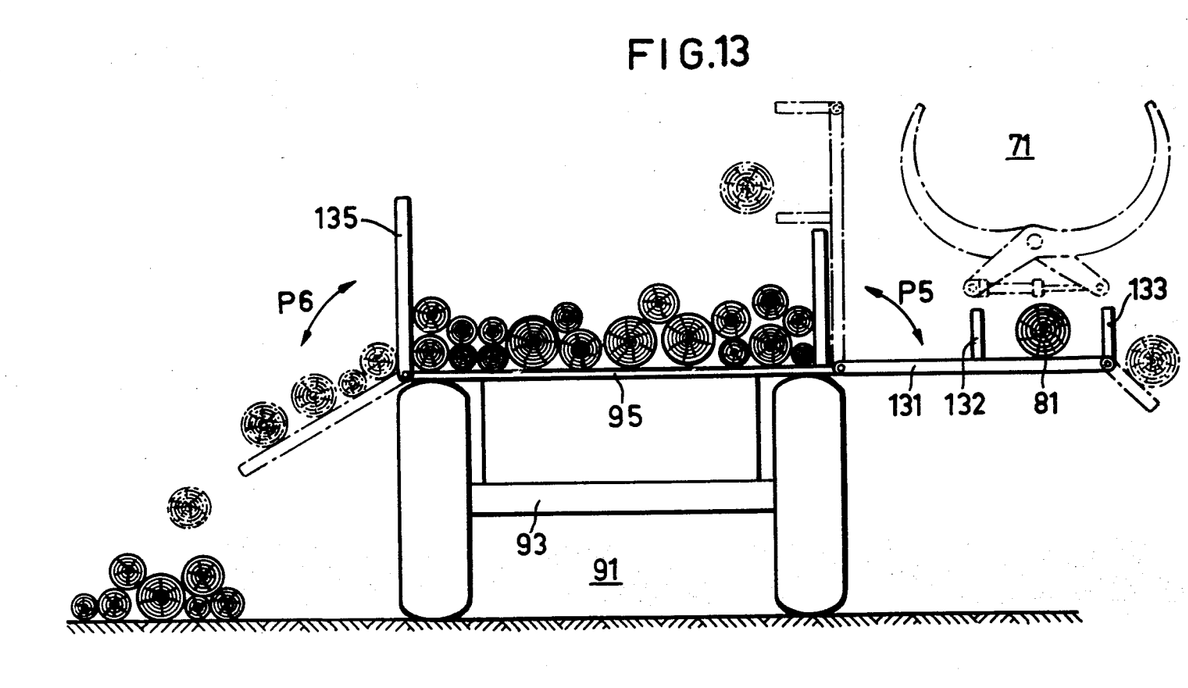
Figure 14:
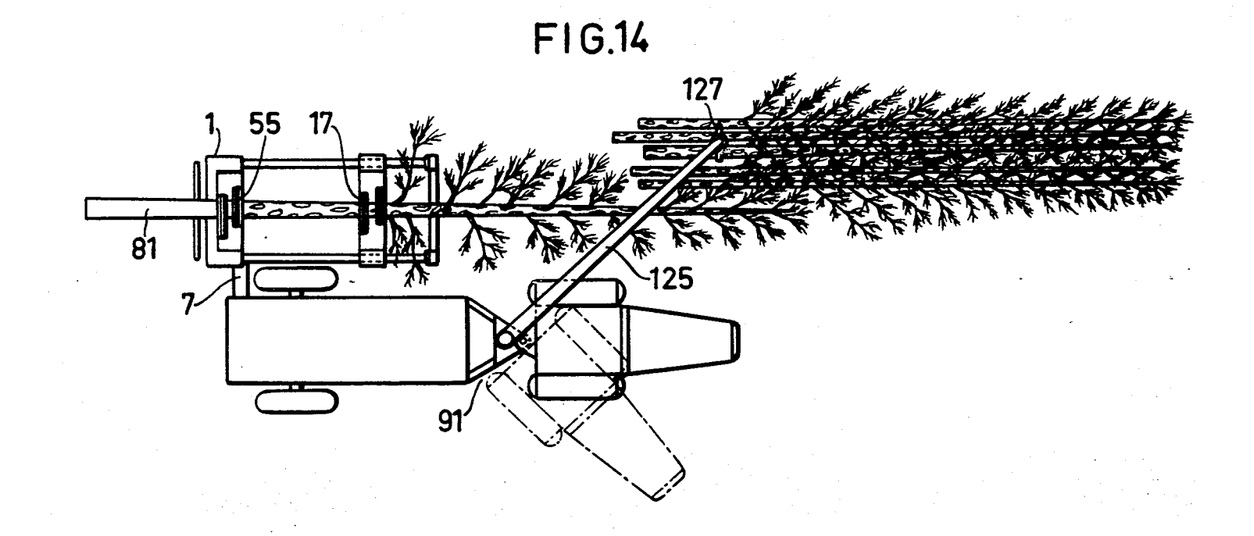

FIGS. 9 and 8 show an apparatus according to FIGS. 1 to 7 while operating upon a tree trunk 81 and the functioning of the apparatus will be described below in greater detail with reference to said figures. FIG. 8 shows a working position, in which the delimbing assembly 11 has moved in the direction of the arrow P1 to a position near the end 5 of the frame. During that movement the delimbing members 17 have been swung inwards to the trunk of the tree and the delimbing members 55 have been brought into a strong pressure contact with the trunk, by which the trunk will be held fast relative to the frame 3. During the right-hand movement of the delimbing assembly 11 according to FIG. 8, the limbs 101 of the tree will be cut away along a distance corresponding to the distance between the assembly 51 and the assembly 11, when the latter is in the right-hand end position according to FIG. 1.

When the assembly 11 has reached its end position at the end 5 of the frame the delimbing members 17 are, by means of the hydraulic motor 23, pressed firmly against the trunk so that the latter will be held fast relative to the delimbing assembly 11 and at the same time the pressure of the delimbing members 55 on the tree trunk is removed. After that the hydraulic motor 37 is driven in such a manner that the delimbing assembly 11 is moved to the left, as shown in FIG. 9 by the arrow P2. During this movement the assembly 11 moves the trunk 81 to the left by which snags 103, that have been left during the movement of the delimbing members 17 to the right, according to FIG. 8, are now cut away by the delimbing members 55. When the delimbing assembly 11 has reached its left-hand end position near the delimbing assembly 51 the pressure on the trunk, exerted by the members 17, is removed whilst the members 55 are pressed firmly against the trunk, after which the delimbing assembly 17 is again moved to the right while delimbing a nondelimbed portion of the trunk that has been fed forward during the left-hand movement according to FIG. 9. In this way an intermittent feeding and delimbing of the trunk is obtained until it has become delimbed along its whole length.

The hydraulic motor 37 together with its appertaining rope devices for operating the delimbing assembly 11 preferably is arranged in such a manner that the right-hand movement of the assembly 11, according to FIG. 8, during which movement the trunk is kept unmoved, takes place essentially quicker than the left-hand movement according to FIG. 9, during which the tree is simultaneously moved forward. The last-mentioned movement may, for example, take place at a speed of 0.5 –2 m./s., preferably about 1 m./s., whereas the right-hand movement of the delimbing assembly 11 may take place at a speed of 2 –6 m./s., preferably about 4 m./s.

Guiding means, not shown, may be arranged in such a manner that the assembly 11, after having reached its right-hand end position is moved a little distance, e.g. 1 dm., to the left before the delimbing members 17 are brought into a strong pressure contact with the trunk. Alternatively the guiding means may be arranged, after the feeding of the log to the left by means of the assembly 11 and prior to the latter having reached its left-hand end position, to cause the engagement of the delimbing members 17 to cease, so that the assembly 11 is moved a little bit farther to the left without the log being fed forward. The object of such guiding means is to safeguard that the delimbing members 17, on starting their delimbing work when the assembly 11 is being moved to the right, shall always have attained the required high speed for obtaining the best possible delimbing result, which would not otherwise be the case, if the delimbing members 17 are, in the left-hand end position of the assembly 11, immediately near or in engagement with uncut limbs.

During the right-hand movement of the delimbing assembly 11 the cutting of the trunk to the desired length can be effected by the cutting means 71.

That piece of length of the trunk which is being delimbed and fed forward, respectively, during each cycle of operation of the movable assembly 11 may, in principle, be chosen arbitrarily and is limited only by the length of the frame 3 of the delimbing assembly 11. In one practical embodiment of the apparatus according to the invention the length of forward feed preferably is chosen to be equal to one standard length for pulpwood, e.g., 2 or 3 meters. Tree trunks or parts of tree trunks that are suitable for use as pulpwood are then cut off gradually into lengths suitable for use as pulpwood, while the tree is kept fixed and the assembly 11 performs a rapid delimbing of the succeeding part of the trunk. If the tree trunk is suitable for use as saw timber, the cutting means is put out of function until the desired length of the log has been dislimbed, after which cutting is done. The remaining part of the log may then, if desired, be delimbed and be cut to pulpwood by means of the device described.

As will appear from the drawings, the shown embodiment of the apparatus according to the invention comprises members 17 and 55, respectively, which are provided with sharp edges 20 for delimbing purposes. It is, however, obvious that the members 17 and 55 may be embodied in other ways. Thus, in certain cases the members 17 may be embodied only as gripping arms for holding the nondelimbed tree trunk during the left-hand movement of the assembly 11 according to FIG. 9. During the return movement of the assembly 11 to the right, according to FIG. 8, delimbing will then be incomplete or not at all. In an embodiment of the kind just mentioned the members 55 should be designed for full delimbing of the tree trunk during the forward feeding thereof to the left according to FIG. 9. However, the embodiment shown, in which the members 17 also serve as delimbing members, is to be preferred, because the delimbing by means of the members 17, thanks to the high speed of the assembly 11, renders a very good delimbing result. As an alternative of, or a supplement to, the stationary delimbing members 55 at the left-hand end of the frame 3 according to FIG. 1, stationary delimbing members may, in a similar manner, be provided at the right-hand end of the frame 3, at the end portion 5. In that case the delimbing members may be embodied for complete delimbing of the tree trunk and then the members 17 of the assembly 11 need only be embodied for holding the tree trunk for the forward feeding thereof.

The invention may be embodied in other specific forms without departing from the spirit or essential characteristics thereof. The present invention is therefore to be considered in all respects as illustrative and not restrictive, the scope of the invention being indicated by the appended claims rather than the foregoing description, and all changes which come within the meaning and range of equivalency of the claims are therefore to be embraced therein.

I claim:

1. An apparatus for delimbing trees comprising a frame, means for effecting relative feeding movement between a tree to be worked upon and said apparatus, a plurality of delimbing knives, a like plurality of shafts extending substantially in the direction of length of the tree and having said knives pivotally mounted thereon for movement towards and from the tree, said delimbing knives being mounted in pairs on each side of a vertical plane containing the centerlines of the tree and being adapted for delimbing the upper portion of the tree trunk and another pair of delimbing knives being mounted on each side of said plane and being adapted for delimbing a portion of said tree trunk located beneath said upper portion of the trunk.

2. An apparatus as claimed in claim 2, wherein the shafts of one pair of knives are located in a first horizontal plane substantially parallel to the centerline of the tree and the shafts of said another pair of knives are located in a second horizontal plane extending substantially parallel to and at a considerable distance from said first plane.

3. An apparatus as claimed in claim 2, in which the distance between the pair of shafts in said second plane is considerably greater than the distance between the pair of shafts in said first plane.

4. An apparatus as claimed in claim 1, wherein said delimbing knives are swingable between an operative position in which the delimbing members are in contact with the tree and an inoperative position in which the delimbing members permit the insertion of an undelimbed tree in a direction from above into said delimbing assembly.

5. An apparatus as claimed in claim 1, wherein said delimbing knives are bent inwardly to partly surround the tree trunk.